United States Patent
Su et al.

(10) Patent No.: US 8,154,429 B2
(45) Date of Patent: Apr. 10, 2012

(54) KEYBOARD DEVICE

(75) Inventors: Chien-Ming Su, Taipei (TW);
Yuan-Lan Yang, Taipei (TW);
Chih-Wen Su, Taipei (TW); Chun-Nan Su, Taipei (TW); Chin-Lung Lai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 799 days.

(21) Appl. No.: 12/246,146

(22) Filed: Oct. 6, 2008

(65) Prior Publication Data
US 2009/0261991 A1 Oct. 22, 2009

(30) Foreign Application Priority Data
Apr. 18, 2008 (TW) ................. 97114219 A

(51) Int. Cl.
*H03K 17/94* (2006.01)
*H03M 11/00* (2006.01)
(52) U.S. Cl. ......................................... 341/34
(58) Field of Classification Search ............ 341/22, 341/34, 6; 345/173, 174; 715/702
See application file for complete search history.

(56) References Cited

U.S. PATENT DOCUMENTS

| | | | | |
|---|---|---|---|---|
| 4,296,406 A * | 10/1981 | Pearson | | 341/34 |
| 4,523,060 A * | 6/1985 | Maguire | | 200/5 A |
| 4,901,074 A * | 2/1990 | Sinn et al. | | 341/22 |
| 4,920,343 A * | 4/1990 | Schwartz | | 341/33 |
| 4,975,676 A * | 12/1990 | Greenhalgh | | 338/114 |
| 5,228,562 A * | 7/1993 | Burk | | 200/512 |
| 5,450,078 A * | 9/1995 | Silva et al. | | 341/23 |
| 5,872,527 A * | 2/1999 | Yanagisawa | | 341/22 |
| 5,945,929 A * | 8/1999 | Westra | | 341/34 |
| 6,028,271 A * | 2/2000 | Gillespie et al. | | 178/18.01 |
| 6,137,427 A * | 10/2000 | Binstead | | 341/33 |
| 6,597,343 B1* | 7/2003 | Akiyama et al. | | 345/168 |
| 6,603,408 B1* | 8/2003 | Gaba | | 341/34 |
| 6,861,961 B2* | 3/2005 | Sandbach et al. | | 341/22 |
| 7,220,930 B2* | 5/2007 | Gordon et al. | | 200/311 |
| 7,782,230 B2* | 8/2010 | Olodort et al. | | 341/22 |
| 2003/0201915 A1* | 10/2003 | Anderson et al. | | 341/22 |
| 2005/0068202 A1* | 3/2005 | Shipman | | 341/22 |
| 2005/0099392 A1* | 5/2005 | Ishida | | 345/163 |
| 2005/0110769 A1* | 5/2005 | DaCosta et al. | | 345/173 |
| 2005/0162404 A1* | 7/2005 | Chiu et al. | | 345/173 |
| 2006/0192690 A1* | 8/2006 | Philipp | | 341/33 |
| 2007/0257821 A1* | 11/2007 | Son et al. | | 341/22 |
| 2008/0042994 A1* | 2/2008 | Gillespie et al. | | 345/174 |
| 2008/0278353 A1* | 11/2008 | Smith et al. | | 341/22 |

\* cited by examiner

*Primary Examiner* — Rexford Barnie
*Assistant Examiner* — Christopher Clark
(74) *Attorney, Agent, or Firm* — Kirton & McConkie; Evan R. Witt

(57) ABSTRACT

The present invention relates to a keyboard device. The keyboard device includes a base, a main circuit board, a base cover, a touching membrane switch, a touching thin plate, an upper cover and a plurality of keys. The touching membrane switch is activated to implement a predefined hot key function so as to reduce fabricating cost.

3 Claims, 5 Drawing Sheets

US 8,154,429 B2

KEYBOARD DEVICE

FIELD OF THE INVENTION

The present invention relates to a keyboard device, and more particularly to a keyboard device having a hotkey function.

BACKGROUND OF THE INVENTION

With increasing development of high technology industries, computers are widely used in our daily lives, or otherwise employed for working or amusement purposes. Among the peripheral devices of the computer systems, keyboard devices are essential bridges between the users and the computer systems. Recently, keyboard devices have experienced great growth and are now rapidly gaining in popularity.

Conventionally, when one or more keys are depressed, corresponding characters, numbers or signs are inputted into the computer system. Due to the amazing power of computer systems, computer systems are developed to have various functions. For example, the computer systems are widely used for playing multimedia files or linking to Internet. Under this circumstance, the conventional function of inputting characters by the keyboard device is not satisfied. For helping the user well operate the computer, many novel keyboard devices with expanded functions are developed in views of humanization and user-friendliness. An example of the novel keyboard devices includes a keyboard device with hot keys. A hot key is a key or a set of keys that performs a predefined function. The hot keys of the keyboard device include but are not limited to sound volume hot keys, Web browser hot keys, and the like.

FIG. 1 is a schematic perspective view illustrating a conventional keyboard device. As shown in FIG. 1, the keyboard device 100 comprises a base 101, a touch panel 102, an upper cover 103 and a plurality of keys 104. These keys 104 are mounted on the base 101 and protruded through the upper cover 103. When one or more keys 104 are depressed, corresponding characters, numbers or signs are inputted into the computer system. The upper cover 103 has an opening 1031 for receiving the touch panel 102 and exposing the touch panel 102 to the upper cover 103. The touch panel 102 has a hot key function. When the user touches the touch panel 102, a predefined function (e.g. a sound volume control function) is performed.

FIG. 2 is a schematic perspective view illustrating the inner portion of the conventional keyboard device shown in FIG. 1. The keyboard device 100 comprises the base 101, the plurality of keys 104, a main circuit board 105 and a touching circuit board 106. Within the keyboard device 100, the main circuit board 105 is mounted on the base 101. The main circuit board 105 includes electronic components and electrical traces required for operating the keyboard device 100. The touching circuit board 106 is mounted on the base 101. The touch panel 102 is received in the opening 1031 of the upper cover 103 (as shown in FIG. 1). After the upper cover 103 is placed on the base 101, the touch panel 102 is disposed on the position corresponding to the touching circuit board 106. As shown in FIG. 1, the touch panel 102 is a draggable strip panel made of polycarbonate (PC).

As shown in FIGS. 1 and 2, the hot key function of the keyboard device 100 is implemented by the touch panel 102. The operation of executing the hot key function will be illustrated in more details as follows.

The finger of the user is an electrical conductor which has stored electrons. The touch panel 102 is disposed on the position corresponding to the touching circuit board 106. When a finger of the user touches the touch panel 102, the touch panel 102 is contacted with the touching circuit board 106 and thus a capacitive effect is generated between the touching circuit board 106 and the user's finger (conductor). Due to the capacitive effect, the capacitance of the touching circuit board 106 under the touch region is increased. As a consequence, the charging and discharging time for the touching circuit board 106 is extended in comparison with the situation that the touch panel 102 is not touched by the finger. The magnitude of the charging and discharging time may be used to discriminate whether the touch panel 102 is touched by the finger or not. In a case that the touch panel 102 is a draggable strip panel for adjusting the sound volume of the computer system, a touch region on the touch panel 102 is sensed by the touching circuit board 106 and defined as a datum point when the user's finger touches the touch region. After the touch region is touched by the user's finger, the user's finger may be moved on the touch panel 102 to adjust the volume sound. For example, if the user's finger is placed on the touch panel 102 and then moved upwardly, the volume sound will be augmented. Whereas, if the user's finger is placed on the touch panel 102 and then moved downwardly, the volume sound will be lessened. As a consequence, the touch panel 102 of the keyboard device 100 can be used to execute the volume sound control function without the need of the volume sound control program.

The dragging action on the touch panel 102 is controlled by the touching circuit board 106. The touching circuit board 106 will execute the instructions corresponding to the finger gestures. The capacitive effect generated when the user's finger is placed on the touch region is distinguished from the capacitive effect generated when the user's finger is moved. As known, complicated algorithm is required to firstly discriminate the touch region of the touch panel 102 where the user's finger is placed and then discriminate the dragging action on the touch panel 102. For implementing the complicated algorithm, the electronic components and associated circuitry layout on the touching circuit board 106 become complicated. Under this circumstance, a bulky touching circuit board 106 is necessary. The complicated circuitry layout is not cost-effective.

Therefore, there is a need of providing a keyboard device with reduced cost.

SUMMARY OF THE INVENTION

It is an object of the present invention to provide a keyboard device having a touching membrane switch to implement a predefined hot key function.

In accordance with an aspect of the present invention, there is provided a keyboard device for use with a computer system. The keyboard device includes a base, a main circuit board, a base cover, a touching membrane switch, a touching thin plate, an upper cover and a plurality of keys. The main circuit board is mounted on the base for controlling operations of the keyboard device. The base cover shelters the base and has an indentation therein. The touching membrane switch is received in the indentation and electrically connected to the main circuit board. The touching membrane switch includes an upper printed wiring board, a lower printed wiring board and a partition plate. The upper printed wiring board has a first trace pattern with a plurality of upper contact terminals. The lower printed wiring board has a second trace pattern with a plurality of lower contact terminals. The partition plate is sandwiched between the upper printed wiring board and the lower printed wiring board and has a plurality of apertures corresponding to the upper contact terminals and the lower contact terminals. The touching thin plate is disposed on the touching membrane switch and has multiple icons thereon. The touching membrane switch is electrically conducted when one of the icons is touched. The upper cover has an opening for exposing the touching thin plate. The keys are protruded through the upper cover.

In an embodiment, the touching thin plate is touched to control a predefined function of adjusting sound volume, vertically scrolling a frame, horizontally scrolling a frame, zooming in/out a frame, opening e-mail, opening a multimedia playback program or opening a Word text file.

Preferably, the touching thin plate is made of polyethylene terephthalate (PET).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention relates to a keyboard device with reduced cost. The keyboard device of the present invention has a touching membrane switch so as to obviate the drawbacks encountered from the prior art.

Figure 1:
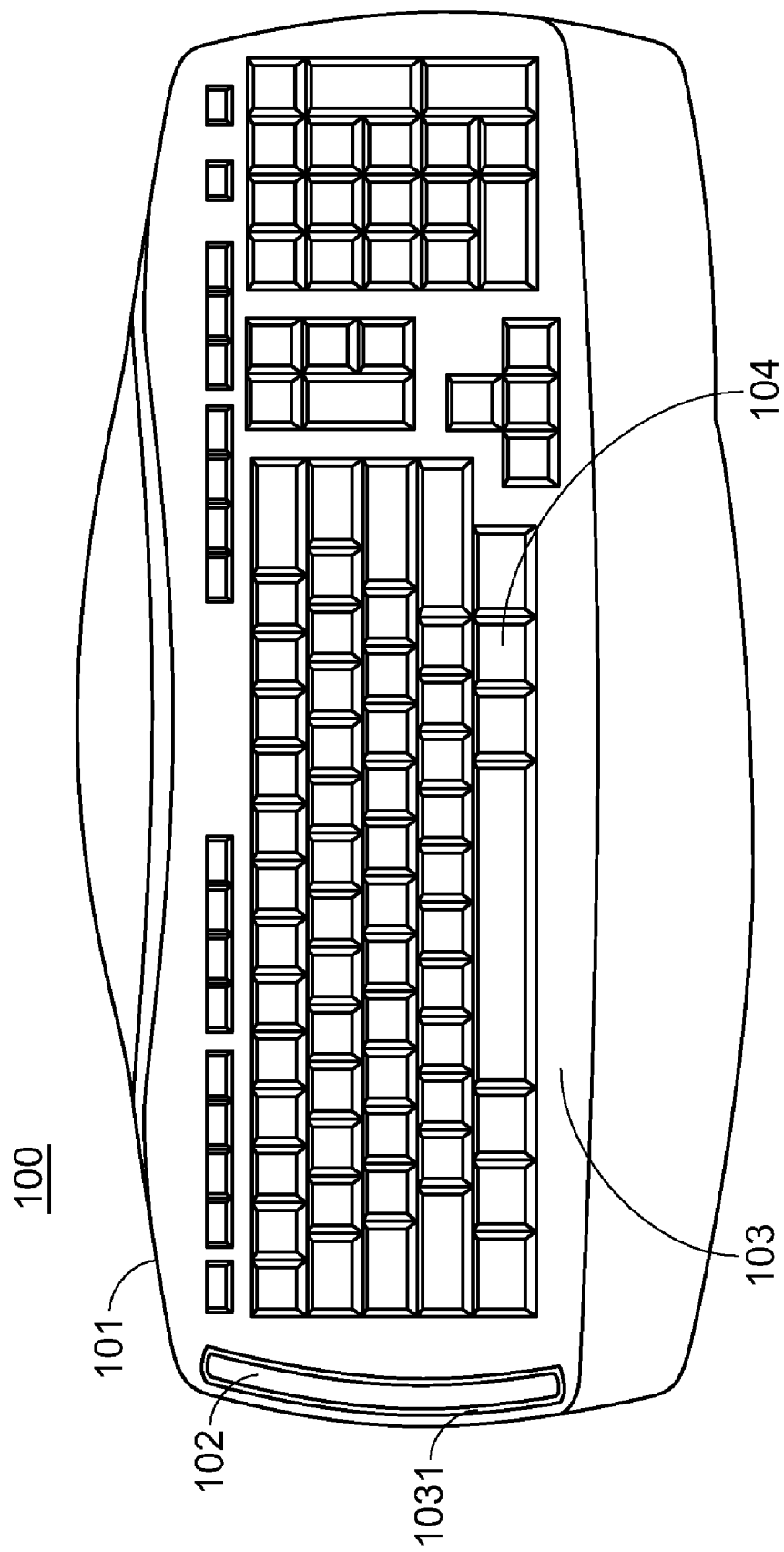
FIG. 1 is a schematic perspective view illustrating a conventional keyboard device.
Figure 2:
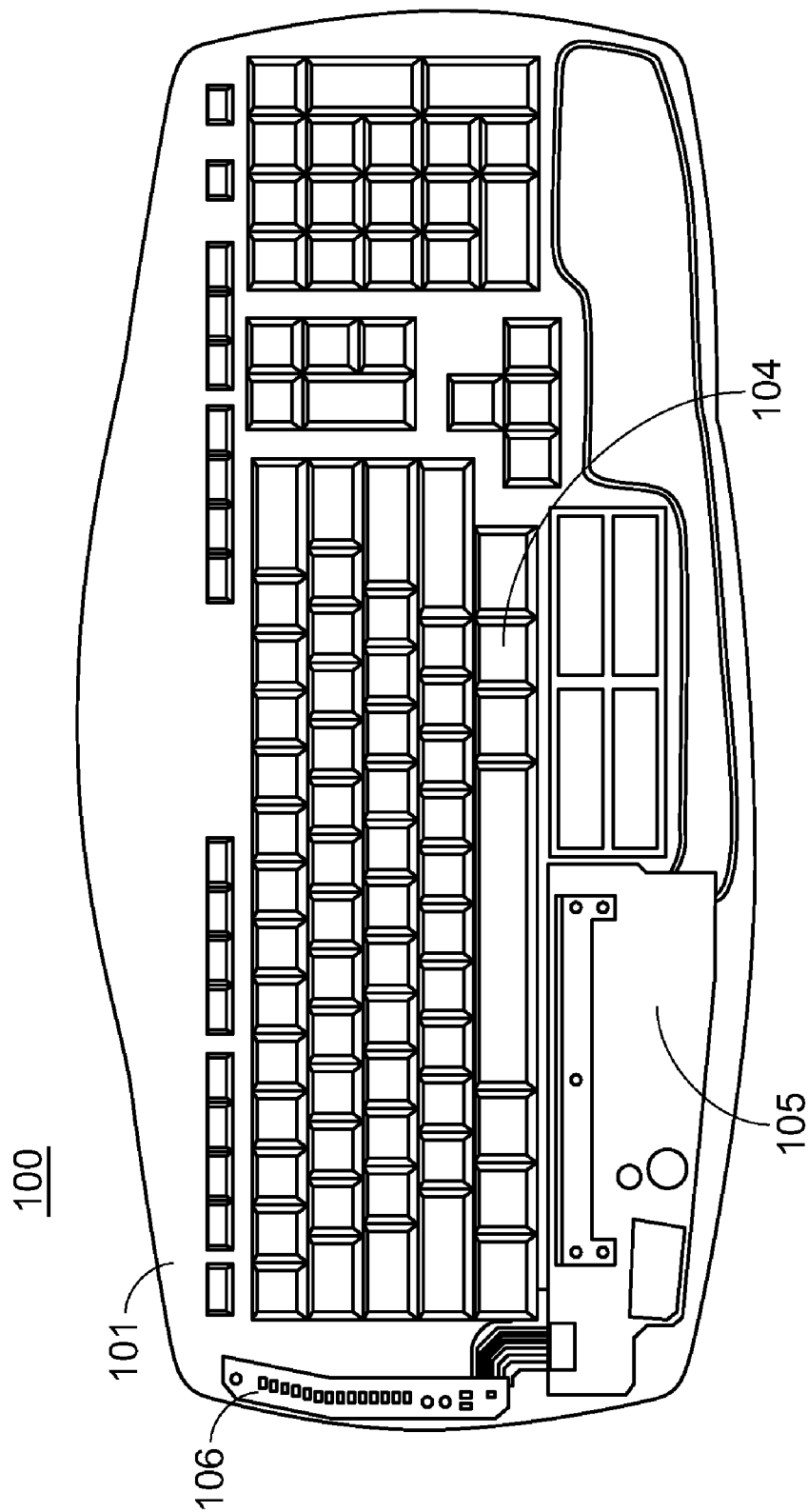
FIG. 2 is a schematic perspective view illustrating the inner portion of the conventional keyboard device shown in FIG. 1.
Figure 3:
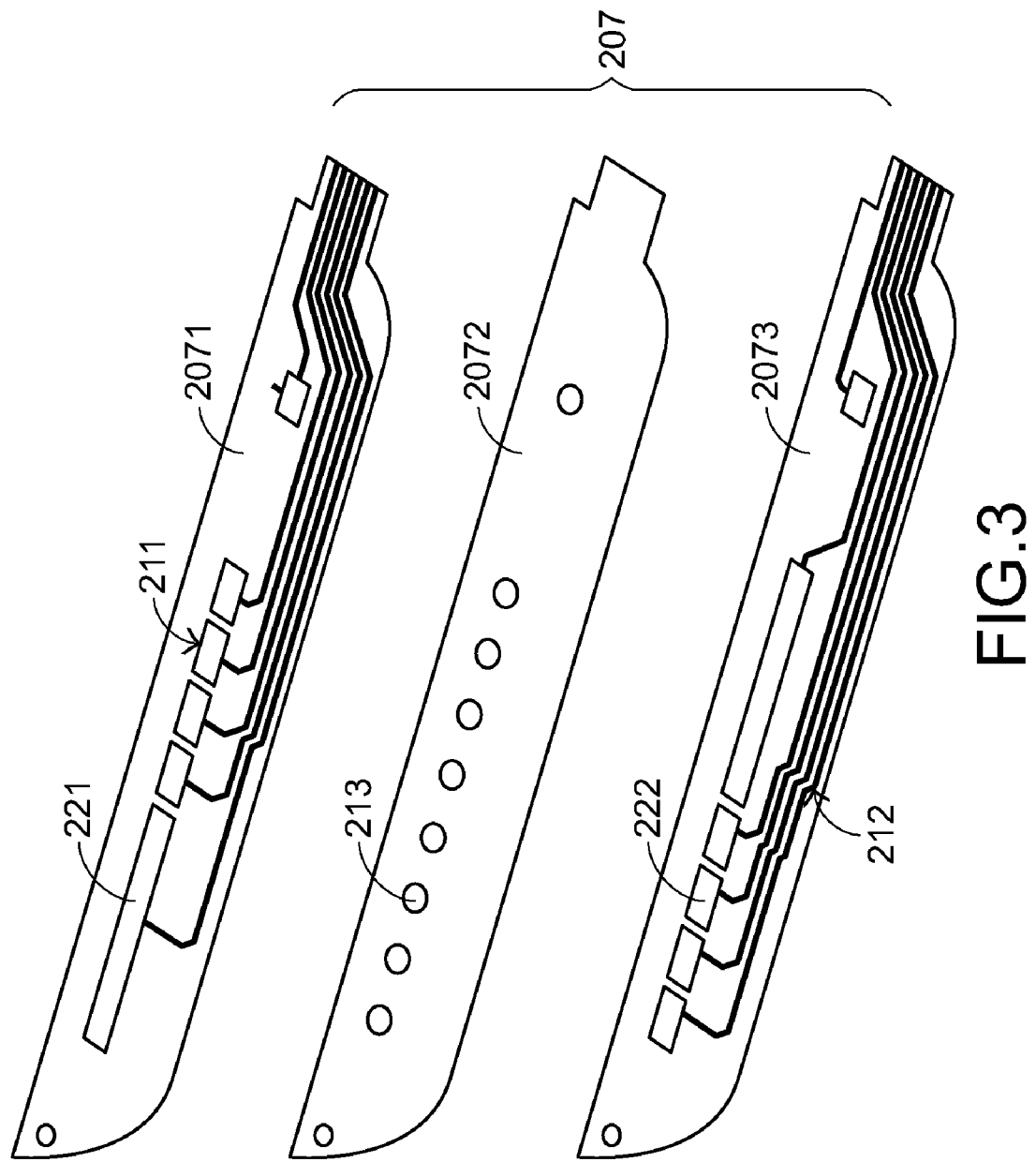
FIG. 3 is a schematic exploded view illustrating a touching membrane switch used in a keyboard device of the present invention.

FIG. 3 is a schematic exploded view illustrating a touching membrane switch used in a keyboard device of the present invention. The touching membrane switch 207 comprises an upper printed wiring board 2071, a partition plate 2072 and a lower printed wiring board 2073 in a stacked arrangement. The upper printed wiring board 2071 has a first trace pattern 211 with a plurality of upper contact terminals 221. The lower printed wiring board 2073 has a second trace pattern 212 with a plurality of lower contact terminals 222. The first trace pattern 211 and the second trace pattern 212 are opposed to each other. After the upper printed wiring board 2071, the partition plate 2072 and the lower printed wiring board 2073 are laminated in the stacked arrangement, the location of the first trace pattern 211 corresponds to the second trace pattern 212. That is, the upper contact terminals 221 of the first trace pattern 211 are aligned with the lower contact terminals 222 of the second trace pattern 212. The partition plate 2072 is sandwiched between the upper printed wiring board 2071 and the lower printed wiring board 2073. The partition plate 2072 has multiple apertures 213 corresponding to the upper contact terminals 221 and the lower contact terminals 222. In a case that the touching membrane switch 207 is not touched by the user's finger, the upper contact terminals 221 of the first trace pattern 211 are separated from the lower contact terminals 222 of the second trace pattern 212 by the partition plate 2072. Whereas, in another case that the touching membrane switch 207 is touched by the user's finger, the depressed upper contact terminal 221 of the upper printed wiring board 2071 will be contacted with a corresponding lower contact terminal 222 of the second trace pattern 212 through a corresponding aperture 213. Under this circumstance, the touching membrane switch 207 is electrically conducted.

Figure 4:
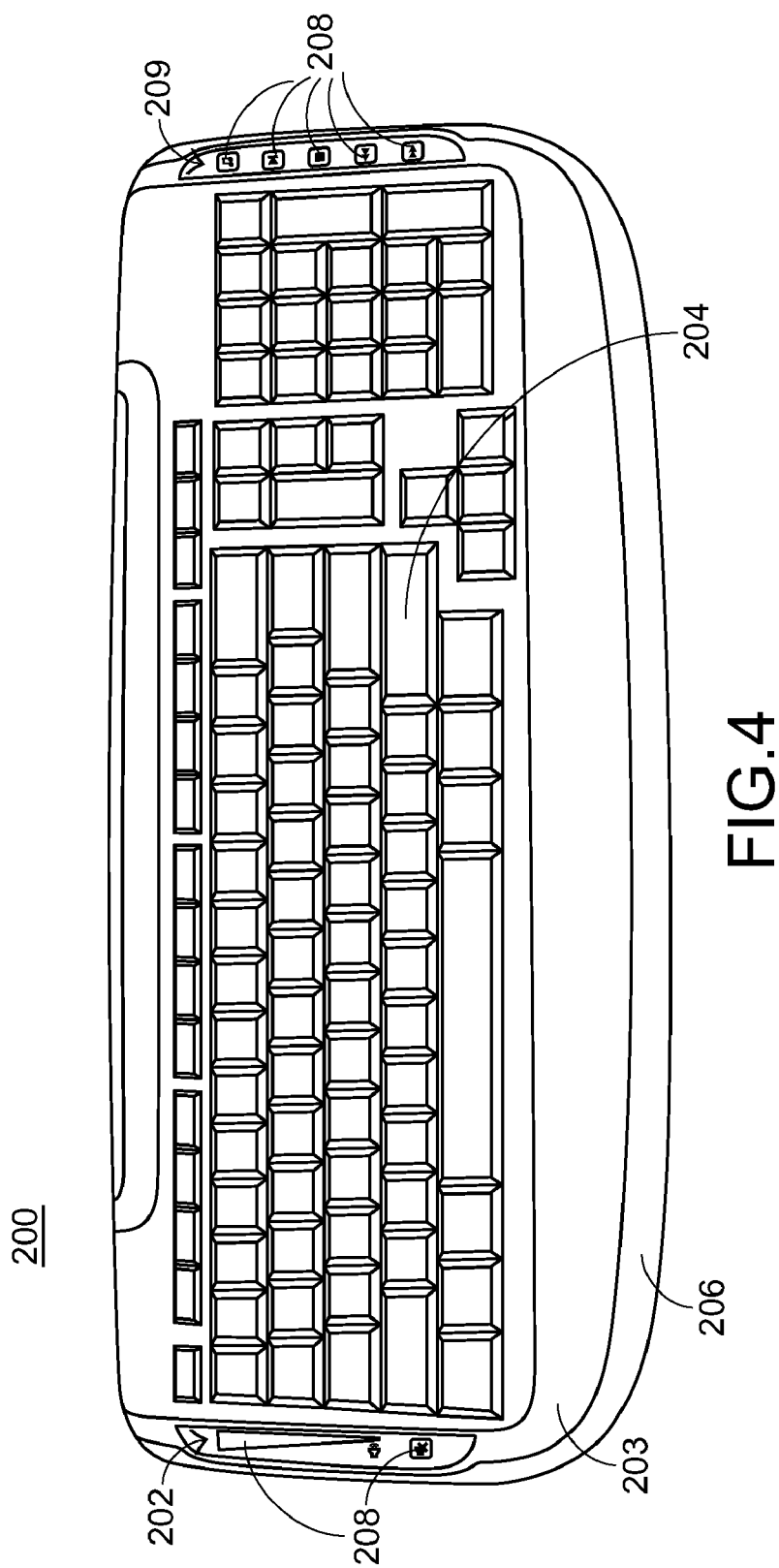
FIG. 4 is a schematic perspective view illustrating a keyboard device according to a first preferred embodiment of the present invention.
Figure 5:
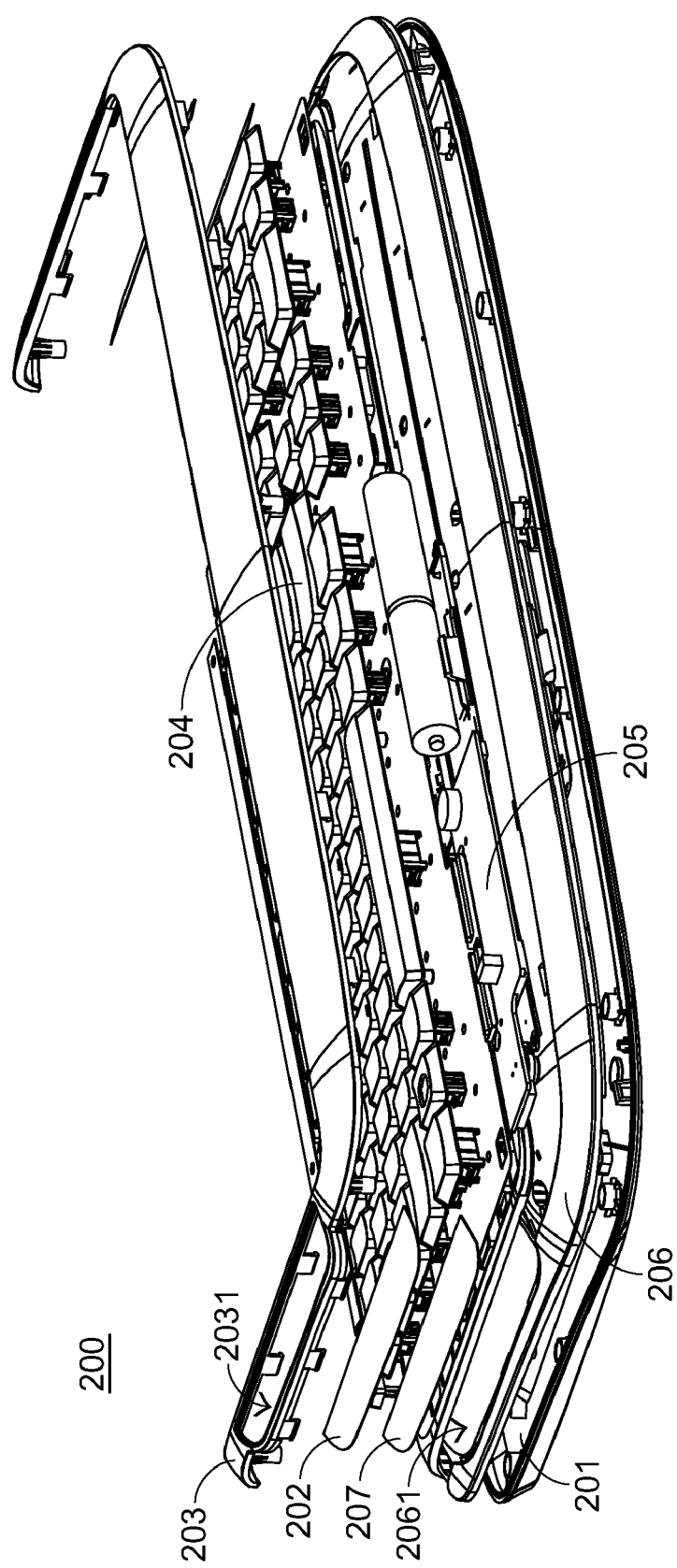
FIG. 5 is a schematic exploded view illustrating the keyboard device shown in FIG. 4

FIG. 4 is a schematic perspective view illustrating a keyboard device according to a first preferred embodiment of the present invention. The keyboard device 200 comprises a base 201 (as shown in FIG. 5), a first touching thin plate 202, a second touching thin plate 209, an upper cover 203, a base cover 206 and a plurality of keys 204. These keys 204 of the keyboard device 200 are mounted on the base 201 and protruded through the upper cover 203. When one or more keys 204 are depressed, corresponding characters, numbers or signs are inputted into the computer system. The upper cover 203 has a first opening 2031 and a second opening 2032 (as shown in FIG. 5) for respectively receiving the first touching thin plate 202 and the second touching thin plate 209 such that these touching thin plates 202 and 209 are exposed to the upper cover 203. When the user touches the first touching thin plate 202 and the second touching thin plate 209, predefined functions are performed.

FIG. 5 is a schematic exploded view illustrating the keyboard device shown in FIG. 4. The keyboard device 200 comprises the base 201, the first touching thin plate 202, the second touching thin plate 209 (as shown in FIG. 4), the upper cover 203, the plurality of keys 204, a main circuit board 205, a base cover 206, a first touching membrane switch 207 and a second touching membrane switch (not shown). The first touching membrane switch 207 and the second touching membrane switch are disposed on the positions corresponding to the first touching thin plate 202 and the second touching thin plate 209, respectively. Within the keyboard device 200, the main circuit board 205 is mounted on the base 201. The main circuit board 205 includes electronic components and electrical traces required for operating the keyboard device 200. The base cover 206 has a first indentation 2061 and a second indentation corresponding to the first touching membrane switch 207 and the second touching membrane switch, respectively. The first touching membrane switch 207 and the second touching membrane switch are received in the first indentation 2061 and the second indentation, respectively. The first touching membrane switch 207 and the second touching membrane switch are electrically connected to the main circuit board 205. The first touching thin plate 202 is stacked on the first touching membrane switch 207 and the second touching thin plate 209 is stacked on the second touching membrane switch. After the upper cover 203 is placed on the base 201, the first touching thin plate 202 and the second touching thin plate 209 are respectively received in the first opening 2031 and the second opening 2032 such that these touching thin plates 202 and 209 are exposed to the upper cover 203 so as to be manipulated by the user. In some embodiments, the first touching thin plate 202 and the second touching thin plate 209 have respective icons 208 thereon. These touching thin plates 202 and 209 are made of polyethylene terephthalate (PET).

Please refer to FIGS. 4 and 5 again. In the keyboard device 200, the icons 208 on the touching thin plates 202 and 209 correspond to respective hot key functions. Since the first touching membrane switch 207 and the second touching membrane switch are sheet-shaped, the volumes and fabricating cost thereof are reduced. In some embodiments, an icon 208 on the first touching thin plate 202 is a strip icon which can be dragged by the user's finger. As shown in FIG. 3, the contact terminals on the first trace pattern 211 of the first touching membrane switch 207 are arranged in a row. The location of the icon 208 on the first touching thin plate 202 corresponds to the row of contact terminals. The icons 208 on the second touching thin plate 209 are arranged in a row. The contact terminals on the trace pattern of the second touching membrane switch are also arranged in a row. The interval between every two adjacent contact terminals is relatively wider in order to prevent adjacent contact terminals from being simultaneously conducted and causing erroneous operations when a single icon 208 is touched.

When a specified icon 208 on the second touching thin plate 209 is touched by a user's finger, the second touching membrane switch is electrically connected. Meanwhile, a corresponding program installed in the main circuit board 205 will execute a predefined function corresponding to the specified icon 208. For example, if the specified icon 208 corresponds to a predefined hot key function of browsing to a website, the computer system (not shown) linked to the keyboard device 200 will browse to a predefined website when the specified icon 208 on the second touching thin plate 209 is touched and the second touching membrane switch is electrically conducted. In addition to the function of browsing to a website, another predefined hot key function of for example opening the e-mail, opening the multimedia playback program, or opening a Word text file will be executed when a corresponding icon 208 is touched. When the user's finger is moved on the strip icon 208 of the first touching thin plate 202, a dragging action is performed according to the finger gestures applied to the strip icon 208 under control of the first touching membrane switch 207 and the first touching thin plate 202. In response to the dragging action, a predefined hot key function of for example adjusting the sound volume of the computer system is executed. In addition to the function of adjusting the sound volume, another predefined hot key function of for example vertically scrolling a frame, horizontally scrolling a frame or zooming in/out a frame.

From the above description, the keyboard device of the present invention is advantageous because the sheet-shaped and cost-effective touching membrane switch is used to replace the conventional touching circuit board. As previously described in the prior art, the touching circuit board should sense the touch region of the touch panel and then identify whether the instruction corresponding to the touch region or the dragging instruction needs to be executed. For implementing the complicated algorithm, the electronic components and associated circuitry layout on the touching circuit board become complicated, so that the conventional keyboard device is not cost-effective. Like the digital switch, the touching membrane switch used in the keyboard device of the present invention is switched between an on status and an off status. As a consequence, the computation of sensing the touch region may be omitted. If no contact terminal adjacent to the touch region has been electrically conducted within a predetermined time period, the instruction corresponding to the touch region is executed. Whereas, if one or more contact terminals adjacent to the touch region or all the contact terminals under the touch region have been electrically conducted within the predetermined time period, the dragging instruction is executed. Since the algorithm of the present keyboard device is simply to be directly written into the main circuit board, no additional touching circuit board is required and the space required to accommodate the touching circuit board is saved. In comparison with the conventional keyboard device, the keyboard device is simplified in structure and algorithm and thus more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device for use with a computer system, said keyboard device comprising:
    a base;
    a main circuit board mounted on said base for controlling operations of said keyboard device;
    a base cover for sheltering said base and having an indentation therein;
    a touching membrane switch received in said indentation and electrically connected to said main circuit board, said touching membrane switch comprising:
        an upper printed wiring board having a first trace pattern with a plurality of upper contact terminals;
        a lower printed wiring board having a second trace pattern with a plurality of lower contact terminals; and
        a partition plate sandwiched between said upper printed wiring board and said lower printed wiring board and having a plurality of apertures corresponding to said upper contact terminals and said lower contact terminals;
    a touching thin plate disposed on said touching membrane switch and having a strip icon thereon, wherein said touching membrane switch is electrically conducted when said icon is touched and when a user's finger is moved on said strip icon of said touching thin plate, a dragging instruction is executed according to finger gestures applied to said strip icon under control of said touching membrane switch and when a user's finger contacts a touch region of said touching thin plate and no upper or lower contact terminal adjacent to said touch region is electrically conducted within a predetermined time period, an instruction corresponding to said touch region is executed, whereas, when one or more contact terminals adjacent to said touch region or all the contact terminals under said touch region are electrically conducted within the predetermined time period, said dragging instruction is executed;
    an upper cover having an opening for exposing said touching thin plate; and
    a plurality of keys protruded through said upper cover.

2. The keyboard device according to claim 1 wherein said touching thin plate is touched to control a predefined function of adjusting sound volume, vertically scrolling a frame, horizontally scrolling a frame, zooming in/out a frame, opening e-mail, opening a multimedia playback program or opening a Word text file.

3. The keyboard device according to claim 1 wherein said touching thin plate is made of polyethylene terephthalate (PET).

* * * * *